US011711759B1

(12) United States Patent
Gupta et al.

(10) Patent No.: US 11,711,759 B1
(45) Date of Patent: *Jul. 25, 2023

(54) ON-DEMAND APPLICATION-DRIVEN NETWORK SLICING

(71) Applicant: Amazon Technologies, Inc., Seattle, WA (US)

(72) Inventors: Diwakar Gupta, Seattle, WA (US); Kiran Kumar Edara, Cupertino, CA (US); Igor A. Kostic, Redmond, WA (US); Kaixiang Hu, Fremont, CA (US); Shane Ashley Hall, Kirkland, WA (US); Ishwardutt Parulkar, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,245

(22) Filed: Apr. 15, 2022

Related U.S. Application Data

(63) Continuation of application No. 17/118,568, filed on Dec. 10, 2020, now Pat. No. 11,310,733.

(51) Int. Cl.
| | |
|---|---|
| *H04W 48/18* | (2009.01) |
| *H04W 28/02* | (2009.01) |
| *H04W 4/60* | (2018.01) |
| *H04W 28/16* | (2009.01) |
| *H04W 4/50* | (2018.01) |
| *H04W 28/08* | (2023.01) |

(52) U.S. Cl.
CPC ............ *H04W 48/18* (2013.01); *H04W 4/50* (2018.02); *H04W 4/60* (2018.02); *H04W 28/0268* (2013.01); *H04W 28/0967* (2020.05); *H04W 28/16* (2013.01)

(58) Field of Classification Search
CPC ... H04W 48/18; H04W 28/0268; H04W 4/60; H04W 28/16; H04W 4/50; H04W 28/0967
See application file for complete search history.

(56) References Cited

U.S. PATENT DOCUMENTS

| | | | |
|---|---|---|---|
| 9,820,212 B2 | 11/2017 | Mukherjee | |
| 11,310,733 B1* | 4/2022 | Gupta | ............... H04W 28/0268 |
| 2014/0122721 A1 | 5/2014 | Marocchi et al. | |
| 2018/0123878 A1* | 5/2018 | Li | .......................... H04L 41/122 |
| 2018/0332441 A1* | 11/2018 | Shaw | .................... H04W 36/26 |
| 2019/0095478 A1 | 3/2019 | Tankersley et al. | |

(Continued)

*Primary Examiner* — Ajay Cattungal
(74) *Attorney, Agent, or Firm* — Perilla Knox & Hildebrandt LLP; Thomas B. Hildebrandt

(57) ABSTRACT

Disclosed are various embodiments for on-demand application-driven network slicing. In one embodiment, it is determined that an application implemented in a particular computing device has an increased quality-of-service requirement in order to send or receive data via a communications network. The increased quality-of-service requirement is greater than an existing quality-of-service provided to the application by the communications network. The application sends a request that causes capacity in a network slice having the increased quality-of-service requirement in the communications network to be allocated for the application. The data is transmitted to or from the application using the network slice.

20 Claims, 9 Drawing Sheets

(56) References Cited

U.S. PATENT DOCUMENTS

| | | | |
|---|---|---|---|
| 2019/0132781 A1 | 5/2019 | Arnold | |
| 2019/0159015 A1* | 5/2019 | Qiao | H04L 41/0894 |
| 2019/0174536 A1* | 6/2019 | Han | H04W 74/0833 |
| 2019/0387401 A1* | 12/2019 | Liao | H04W 28/0289 |
| 2020/0014762 A1* | 1/2020 | Li | H04L 67/562 |
| 2020/0057860 A1* | 2/2020 | Patil | G06F 21/6209 |
| 2020/0195495 A1 | 6/2020 | Parker et al. | |
| 2020/0275313 A1 | 8/2020 | He et al. | |
| 2020/0337111 A1* | 10/2020 | Shi | H04L 67/143 |
| 2020/0367109 A1* | 11/2020 | Chen | H04W 28/18 |
| 2021/0037544 A1* | 2/2021 | Andrews | H04W 72/121 |
| 2021/0144198 A1 | 5/2021 | Yu et al. | |
| 2021/0144517 A1 | 5/2021 | Guim Bernat et al. | |
| 2022/0007451 A1 | 1/2022 | Wang | |

* cited by examiner

ON-DEMAND APPLICATION-DRIVEN NETWORK SLICING

CROSS-REFERENCE TO RELATED APPLICATIONS

This application is a continuation of, and claims priority to, U.S. patent application Ser. No. 17/118,568, entitled "ON-DEMAND APPLICATION-DRIVEN NETWORK SLICING," and filed on Dec. 10, 2020, which is incorporated herein by reference in its entirety.

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
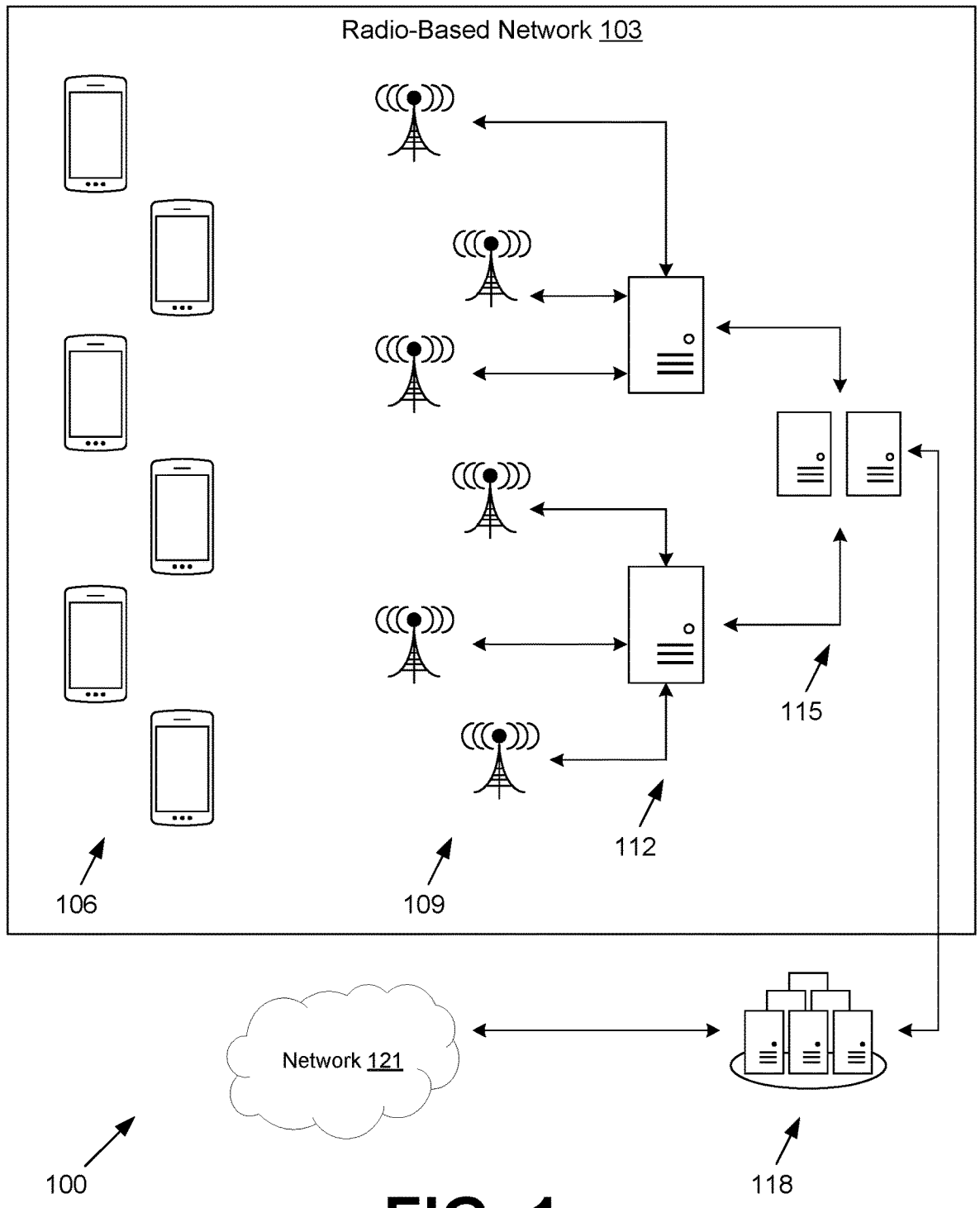
FIG. 1 is a drawing of an example of a communication network that is deployed and managed according to various embodiments of the present disclosure.

The present disclosure relates to on-demand, application-driven network slicing in radio-based networks, such as 4G and 5G radio-based networks, or portions of such radio-based networks, including radio access networks (RAN) and their associated core networks. Specifically, by controlling the network functions and the infrastructure they run on, the disclosed radio-network management service enables applications to effectively program the network. Via application programming interfaces (APIs), an application can pick a set of quality-of-service (QoS) parameters it needs, and the service orchestrates the network functions and reserves the needed resources from the radio to the instance to ensure QoS service-level agreements (SLAs) are met for the duration of the session. Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. By decoupling network functions from specific hardware, the radio-based network and its associated core network become more easily configurable and dynamically reconfigurable. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Sharing of limited resources has long been a problem in communication networks. Circuit-switched networks provided dedicated bandwidth and reliability but were expensive and inefficient. Consequently, circuit-switched networks have largely been replaced with packet-switched networks, such as internet protocol (IP)-based networks, that are more flexible with respect to resource sharing. However, packet-based networks are generally "best effort" networks that do not guarantee that a data packet, when sent, will actually be delivered to its destination. While this is acceptable for many network applications, such as web browsing or email, it may be unacceptable for other network applications, such as video conferencing or sensors, which may require a minimum bandwidth or latency or operate properly.

Various embodiments of the present disclosure implement on-demand slicing of a network, such as radio-based network and its associated core network, in order to ensure quality-of-service for customers and their applications. In some embodiments, applications on client devices are able to request a network slice allocation on-demand by way of a service API. For example, a user of a video conferencing application may designate a video conference as highest priority, thereby causing the application to request a high priority network slice sufficient for video conferencing so that the video conference is not interrupted or impacted by glitches. By letting each application request an on-demand network slice per individual session, use cases are enabled where customers can specify a higher quality of service (QoS) for important connections (e.g., machinery control, important meetings and events) and a lower QoS for other less important connections.

In some embodiments, a network slice allocation service manages the allocations in the network, including automatically scaling resources in the network that are dedicated to network functions. Also, the network slice allocation service may migrate network function workloads from one location to another in the network topology to decrease network function latency as needed to meet quality-of-service requirements for network slices. Conversely, the network slice allocation service may move network function workloads to a core network in a cloud provider network if they are necessary at the edge of the network to provide the requested quality-of-service.

In some embodiments, a content management service may operate alongside the network slice allocation service in order to ensure that content subject to a quality-of-service requirement in a network slice is actually delivered according to that requirement. To this end, the content management service may migrate content delivery network operations to different locations in the network to support the quality-of-service requirement. For example, high bitrate video content from a content delivery network may be predictively cached for a user at the edge of the network in order to provide a high quality-of-service. Such an approach can be beneficial when the usual content delivery servers are accessible via a congested backbone link or via a public Internet connection that does not provide the high quality-of-service.

As one skilled in the art will appreciate in light of this disclosure, certain embodiments may be capable of achieving certain advantages, including some or all of the following: (1) improving the functioning of computer systems and networks by allowing applications to request network slices having a certain quality-of-service dynamically and on-demand, thereby allowing the applications to operate properly according to their bandwidth and latency requirements; (2) improving the flexibility of computer systems and networks by allowing network slices dedicated for applications or devices to be dynamically reconfigured on demand; (3) improving the functioning of computer systems and networks in meeting quality-of-service requirements by migrating network function workloads to different locations in a radio-based network; (4) improving the functioning of computer systems and networks in meeting quality-of-service requirements by allowing computing resources dedicated to network functions to be scaled up or down as needed; (5) improving the functioning of computer systems and networks in meeting quality-of-service requirements by migrating content delivery to different locations in a radio-based network; and so forth.

Among the benefits of the present disclosure is the ability to deploy and chain network functions together to deliver an end-to-end service that delivers a dynamically sized network slice to particular software applications based on their requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provides edge location hardware (as described further below) integrated with network functions that run across the entire network, from cell sites to internet break-outs, and orchestrates the network functions to meet required QoS constraints. This enables an entirely new set of applications that have strict QoS requirements, from factory-based IoT, to augmented reality (AR), to virtual reality (VR), to game streaming, to autonomous navigation support for connected vehicles, that previously could not run on a mobile network.

Network slicing is a capability that enables deployment and operation of multiple logical networks over a common physical network infrastructure in a way that each logical network (i.e., a network slice) can be customized and dimensioned to best serve a specific set of needs. Typically, a network slice is manually created and provided to a particular organization or business entity. According to the present disclosure, software applications running on a radio-based network can make API requests to the service to obtain a network slice that meets a set of QoS constraints provided for the application. In response, the service can automatically provision such a network slice for use by network traffic associated with that application. The network slice can reserve a certain amount of different hardware resources throughout the network (e.g., radio resources, RAN and core processing resources) for use by traffic associated with a particular application in order to achieve the desired QoS. The service can also manage such network slices at scale across a large number of different software applications, for example by provisioning "complementary" slices (that have complementary needs across a set of different hardware components) on the same underlying hardware for more efficient resource utilization, or by over-provisioning slices based on forecasted utilization that indicates all applicable QoS constraints can still be met.

The described "elastic 5G" service provides and manages all the hardware, software and network functions, required to build a network, and can dynamically create and assign network slices to particular applications based on API requests and QoS parameters. In some embodiments the network functions may be developed and managed by the cloud provider, however the described control plane can manage network functions across a range of providers so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end network slice that reflects the network characteristics requested by the software application. By automating network slice creation through application-driven API requests, the disclosed service can dynamically modify network slices to meet the changing demands of a wide range of applications running on the network.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises datacenter. Some cloud native applications can be containerized, for example having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications. In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1, shown is an example of a communication network 100 that is deployed and managed according to various embodiments of the present disclosure. The communication network 100 includes a radio-based network 103, which may correspond to a cellular network such as a fourth-generation (4G) Long-Term Evolution (LTE) network, a fifth-generation (5G) network, a 4G-5G hybrid core with both 4G and 5G RANs, or another network that provides wireless network access. The radio-based network 103 may be operated by a cloud service provider for a public telecommunications provider or for an enterprise or other organization. Various deployments of radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 can include a radio access network (RAN) that provides wireless network access to a plurality of wireless devices 106, which may be mobile devices or fixed location devices. In various examples, the wireless devices 106 may include smartphones, connected vehicles, Internet of Things (IoT) devices, sensors, machinery (such as in a manufacturing facility), hotspots, and other devices. The wireless devices 106 are sometimes referred to as user equipment (UE) or customer premises equipment (CPE).

The radio-based network 103 provides the wireless network access to the plurality of wireless devices 106 through a plurality of cells 109. Each of the cells 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e. encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks.

Figure 2A:
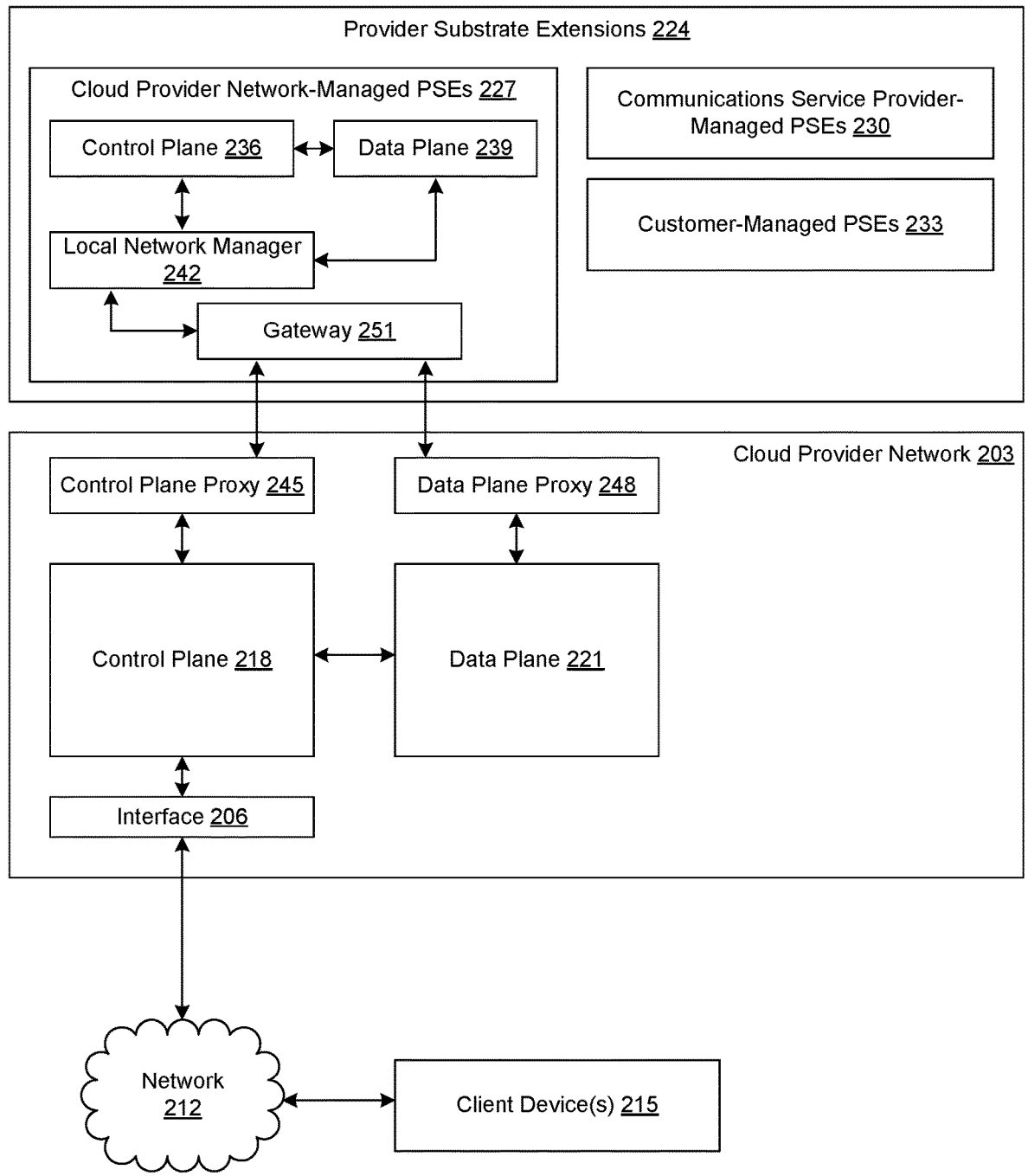
FIG. 2A illustrates an example of a networked environment including a cloud provider network and further including various provider substrate extensions of the cloud provider network, which may be used in various locations within the communication network of FIG. 1, according to some embodiments of the present disclosure.

FIG. 2A illustrates an example of a networked environment 200 including a cloud provider network 203 and further including various provider substrate extensions of the cloud provider network 203, which may be used in various locations within the communication network 100 of FIG. 1, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services using various interfaces 206 (e.g., APIs) via intermediate network(s) 212. An API refers to an interface and/or communication protocol between a client device 215 and a server, such that if the client makes a request in a predefined format, the client should receive a response in a specific format or cause a defined action to be initiated. In the cloud provider network context, APIs provide a gateway 251 for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifiers to a substrate IP, so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network 203 (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data, as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network 203, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network 203. The object storage servers include one or more servers on which data is stored as objects within resources referred to as buckets and can be used to support a managed object storage service of the cloud provider network 203. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A provider substrate extension 224 ("PSE") provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, a PSE 224 can be configured to provide capacity for cloud-based workloads to run within the telecommunications network. In some implementations, a PSE 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such provider substrate extensions 224 can include cloud provider network-managed provider substrate extensions 227 (e.g., formed by servers located in a cloud provider-managed facility separate from those associated with the cloud provider network 203), communications service provider-managed provider substrate extensions 230 (e.g., formed by servers associated with communications service provider facilities), customer-managed provider substrate extensions 233 (e.g., formed by servers located on-premise in a customer or partner facility), among other possible types of substrate extensions.

As illustrated in the example provider substrate extension 224, a provider substrate extension 224 can similarly include a logical separation between a control plane 236 and a data plane 239, respectively extending the control plane 218 and data plane 221 of the cloud provider network 203. The provider substrate extension 224 may be pre-configured, e.g. by the cloud provider network operator, with an appropriate combination of hardware with software and/or firmware elements to support various types of computing-related resources, and to do so in a manner that mirrors the experience of using the cloud provider network 203. For example, one or more provider substrate extension location servers can be provisioned by the cloud provider for deployment within a provider substrate extension 224. As described above, the cloud provider network 203 may offer a set of predefined instance types, each having varying types and quantities of underlying hardware resources. Each instance type may also be offered in various sizes. In order to enable customers to continue using the same instance types and sizes in a provider substrate extension 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the provider substrate extension location servers. This can improve utilization of computing resources within the edge location by allowing for better packing of running instances on servers, and also provides a seamless experience regarding instance usage across the cloud provider network 203 and the cloud provider network-managed provider substrate extension 227.

The provider substrate extension servers can host one or more compute instances. Compute instances can be VMs, or containers that package up code and all its dependencies so an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at a provider substrate extension 224 than in the region, an optimal utilization experience may not be provided if the provider substrate extension includes such dedicated block store servers. Accordingly, a block storage service may be virtualized in the provider substrate extension 224, such that one of the VMs runs the block store software and stores the data of a volume. Similar to the operation of a block storage service in the region of a cloud provider network 203, the volumes within a provider substrate extension 224 may be replicated for durability and availability. The volumes may be provisioned within their own isolated virtual network within the provider substrate extension 224. The compute instances and any volumes collectively make up a data plane extension 239 of the provider network data plane 221 within the provider substrate extension 224.

The servers within a provider substrate extension 224 may, in some implementations, host certain local control plane components, for example, components that enable the provider substrate extension 224 to continue functioning if there is a break in the connection back to the cloud provider network 203. Examples of these components include a migration manager that can move compute instances between provider substrate extension servers if needed to maintain availability, and a key value data store that indicates where volume replicas are located. However, generally the control plane 236 functionality for a provider substrate extension 224 will remain in the cloud provider network 203 in order to allow customers to use as much resource capacity of the provider substrate extension 224 as possible.

The migration manager may have a centralized coordination component that runs in the region, as well as local controllers that run on the PSE servers (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at a provider substrate extension 224 may be designed by the cloud provider to run on the cloud provider substrate network, and this software may be enabled to run unmodified in a provider substrate extension 224 by using local network manager(s) 242 to create a private replica of the substrate network within the edge location (a "shadow substrate"). The local network manager(s) 242 can run on provider substrate extension 224 servers and bridge the shadow substrate with the provider substrate extension 224 network, for example, by acting as a virtual private network (VPN) endpoint or endpoints between the provider substrate extension 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the provider substrate extension 224 to seamlessly communicate with resources in the cloud provider network 203. In some implementations, a single local network manager 242 can perform these actions for all servers hosting compute instances in a provider substrate extension 224. In other implementations, each of the server hosting compute instances may have a dedicated local network manager 242. In multi-rack edge locations, inter-rack communications can go through the local network managers 242, with local network managers maintaining open tunnels to one another.

Provider substrate extension locations can utilize secure networking tunnels through the provider substrate extension 224 network to the cloud provider network 203, for example, to maintain security of customer data when traversing the provider substrate extension 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in a provider substrate extension 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between a provider substrate extension 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of provider substrate extension 224. That is, CP proxies 245 provide infrastructure for tunneling management API traffic destined for provider substrate extension servers out of the region substrate and to the provider substrate extension 224. For example, a virtualized computing service of the cloud provider network 203 can issue a command to a VMM of a server of a provider substrate extension 224 to launch a compute instance. A CP proxy 245 maintains a tunnel (e.g., a VPN) to a local network manager 242 of the provider substrate extension 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at a provider substrate extension 224 or may be able to manage control plane traffic for multiple servers in the same provider substrate extension.

A data plane (DP) proxy 248 can also be provisioned in the cloud provider network 203 to represent particular server(s) in a provider substrate extension 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span provider substrate extensions 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the provider substrate extension server(s) and the cloud provider network 203. Data plane traffic flowing between a provider substrate extension 224 and the cloud provider network 203 can be passed through DP proxies 248 associated with that provider substrate extension 224. For data plane traffic flowing from a provider substrate extension 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to a provider substrate extension 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using provider substrate extension resources in a manner analogous to the way in which such commands would be issued with respect to compute instances hosted within the cloud provider network 203. From the perspective of the customer, the customer can now seamlessly use local resources within a provider substrate extension 224 (as well as resources located in the cloud provider network 203, if desired). The compute instances set up on a server at a provider substrate extension 224 may communicate both with electronic devices located in the same network as well as with other resources that are set up in the cloud provider network 203, as desired. A local gateway 251 can be implemented to provide network connectivity between a provider substrate extension 224 and a network associated with the extension (e.g., a communications service provider network in the example of a provider substrate extension 230).

There may be circumstances that necessitate the transfer of data between the object storage service and a provider substrate extension (PSE) 224. For example, the object storage service may store machine images used to launch VMs, as well as snapshots representing point-in-time backups of volumes. The object gateway can be provided on a PSE server or a specialized storage device, and provide customers with configurable, per-bucket caching of object storage bucket contents in their PSE 224 to minimize the impact of PSE-region latency on the customer's workloads. The object gateway can also temporarily store snapshot data from snapshots of volumes in the PSE 224 and then sync with the object servers in the region when possible. The object gateway can also store machine images that the customer designates for use within the PSE 224 or on the customer's premises. In some implementations, the data within the PSE 224 may be encrypted with a unique key, and the cloud provider can limit keys from being shared from the region to the PSE 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and a PSE bucket can be created (on the object store servers) to store snapshot data and machine image data using the PSE encryption key.

In the manner described above, a PSE 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "far zones" (due to being far from other availability zones) or "near zones" (due to being near to customer workloads). A near zone may be connected in various ways to a publicly accessible network such as the Internet, for example directly, via another network, or via a private connection to a region. Although typically a near zone would have more limited capacity than a region, in some cases a near zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network 203. This type of substrate extension located outside of cloud provider network data centers can be referred to as an "outpost" of the cloud provider network 203. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network 203, close to customer devices and/or workloads.

In the example of FIG. 1, the distributed computing devices 112 (FIG. 1), the centralized computing devices 115 (FIG. 1), and the core computing devices 118 (FIG. 1) may be implemented as provider substrate extensions 224 of the cloud provider network 203. The installation or siting of provider substrate extensions 224 within a communication network 100 can vary subject to the particular network topology or architecture of the communication network 100. Provider substrate extensions 224 can generally be connected anywhere the communication network 100 can break out packet-based traffic (e.g., IP based traffic). Additionally, communications between a given provider substrate extension 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between a provider substrate extension 224 and the cloud provider network 203 can be broken out of the communication network 100 without routing through the core network.

In some embodiments, provider substrate extensions 224 can be connected to more than one communication network associated with respective customers. For example, when two communication networks of respective customers share or route traffic through a common point, a provider substrate extension 224 can be connected to both networks. For example, each customer can assign some portion of its network address space to the provider substrate extension 224, and the provider substrate extension can include a router or gateway that can distinguish traffic exchanged with each of the communication networks 100. For example, traffic destined for the provider substrate extension 224 from one network might have a different destination IP address, source IP address, and/or virtual local area network (VLAN) tag than traffic received from another network. Traffic originating from the provider substrate extension 224 to a destination on one of the networks can be similarly encapsulated to have the appropriate VLAN tag, source IP address (e.g., from the pool allocated to the provider substrate extension 224 from the destination network address space) and destination IP address.

Figure 2B:
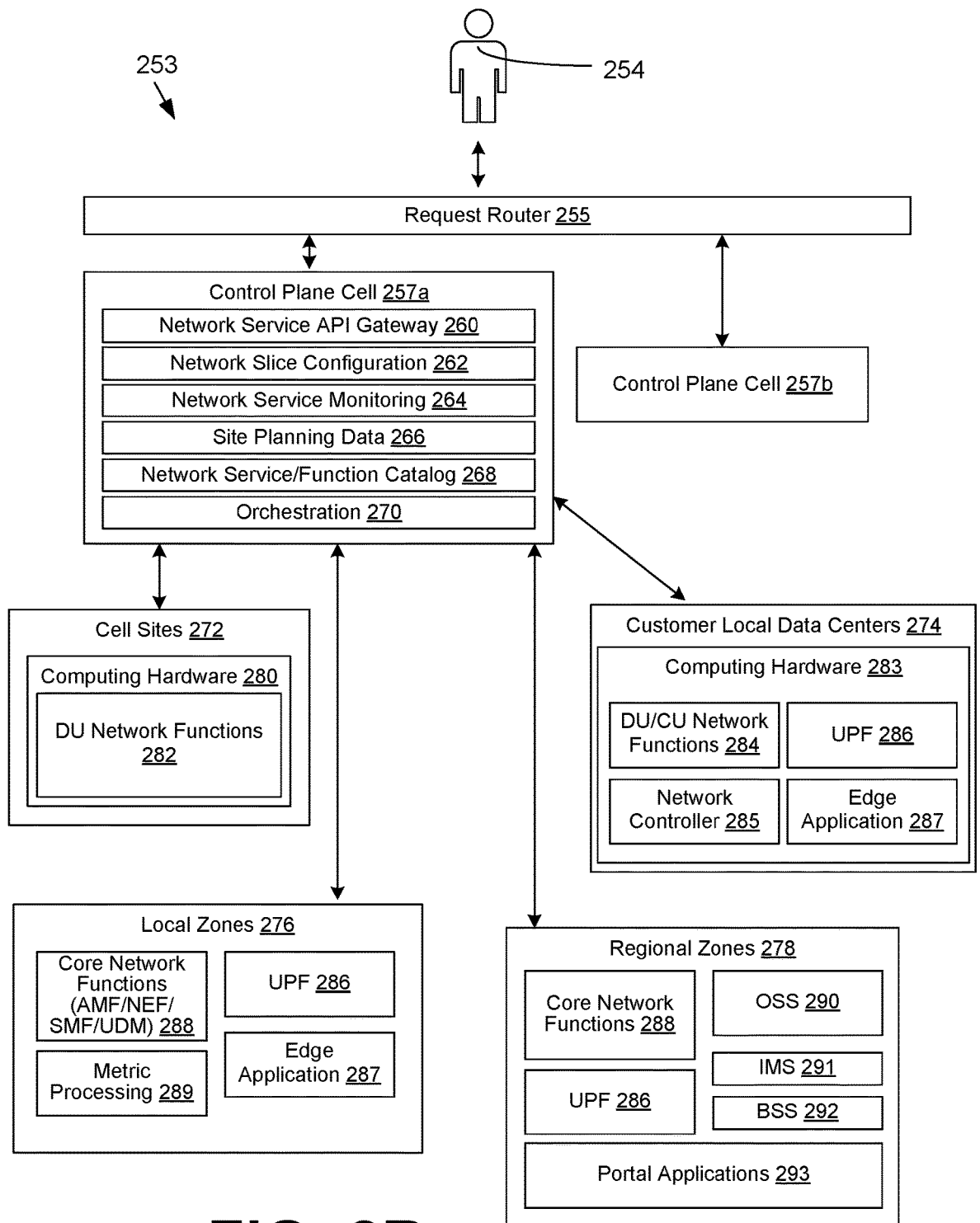
FIG. 2B depicts an example of cellularization and geographic distribution of the communication network of FIG. 1 for providing highly available user plane functions (UPFs).

FIG. 2B depicts an example 253 of cellularization and geographic distribution of the communication network 100 (FIG. 1) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103.

The control plane cell 257 may be in communication with one or more cell sites 272, one or more customer local data centers 274, one or more local zones 276, and one or more regional zones 278. The cell sites 272 include computing hardware 280 that executes one or more distributed unit (DU) network functions 282. The customer local data centers 274 include computing hardware 283 that execute one or more DU or central unit (CU) network functions 284, a network controller, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 278 can implement a "stateless" architecture that shares a common session database across multiple sites (such as across availability zones or edge sites).

Figure 3:
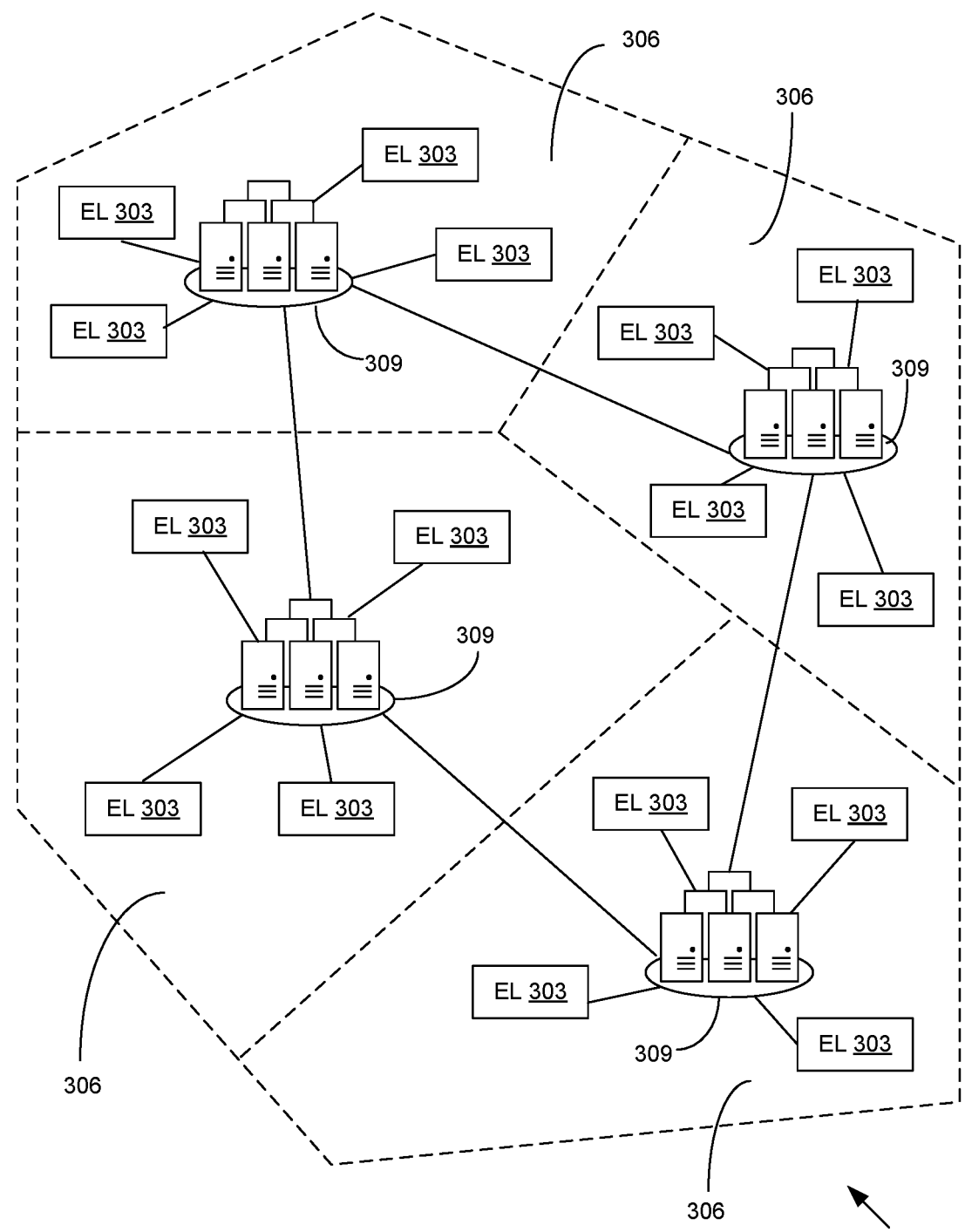
FIG. 3 illustrates an example of the networked environment of FIG. 2A including geographically dispersed provider substrate extensions according to some embodiments of the present disclosure.

FIG. 3 illustrates an exemplary cloud provider network 203 including geographically dispersed provider substrate extensions 224 (FIG. 2A) (or "edge locations 303") according to some embodiments. As illustrated, a cloud provider network 203 can be formed as a number of regions 306, where a region is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306.

Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components like local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 4:
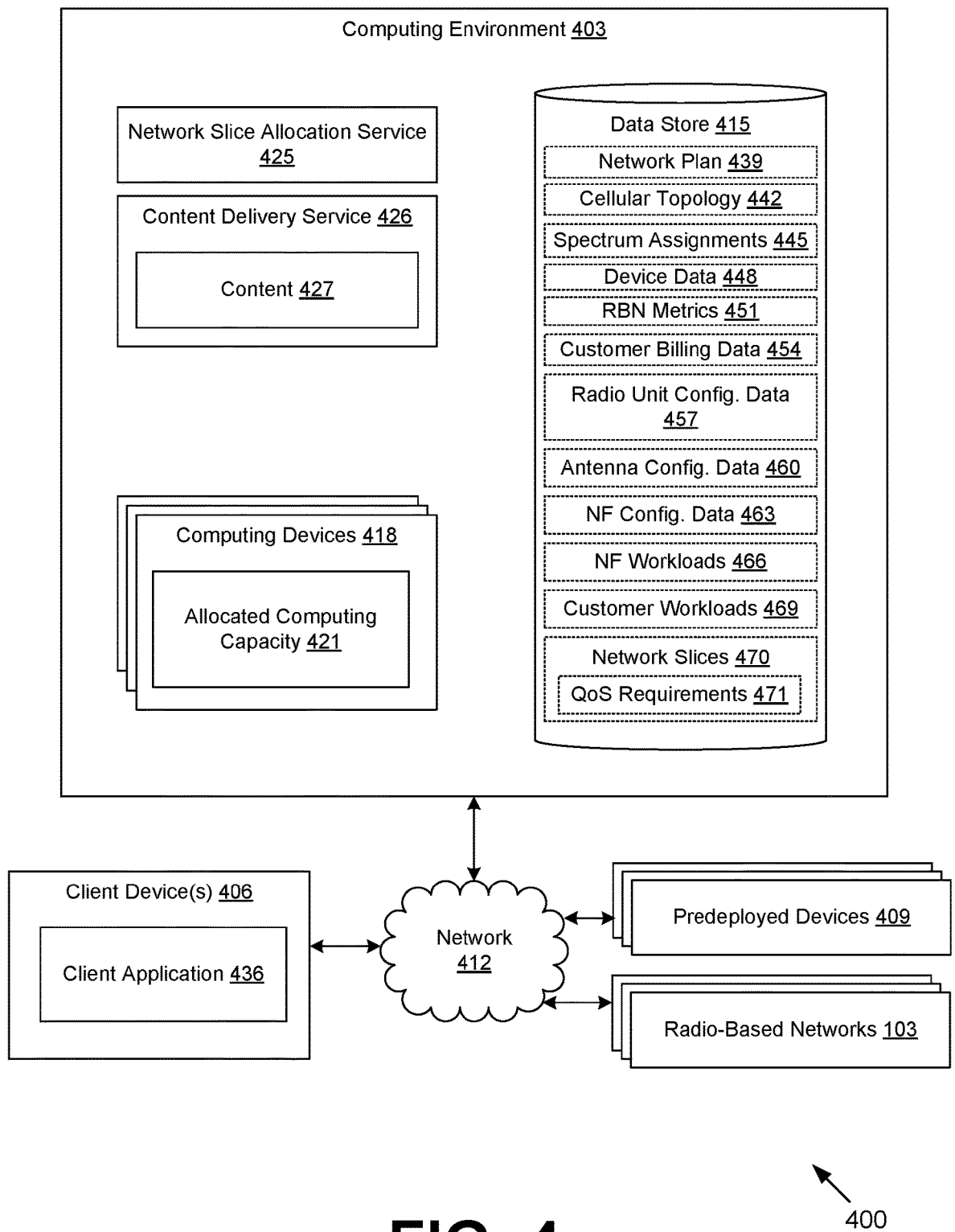
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more predeployed devices 409, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203 (FIG. 2A), where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network 203 offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The allocated computing capacity 421 may correspond to virtual machine (VM) instances, containers, or serverless functions that are executed in the computing devices 418. The virtual machine instances may be instantiated from a virtual machine (VM) image. To this end, customers may specify that a virtual machine instance should be launched in the computing devices 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances or containers, which may offer different quantities of resources available via the computing device 418. For example, some types of VM instances or containers may offer more memory and processing capability than other types of VM instances or containers.

The components executed on the computing environment 403, for example, include a network slice allocation service 425, a content delivery service 426, and other applications, services, processes, systems, engines, or functionality not discussed in detail herein. The network slice allocation service 425 is executed to allocate network slices on-demand to applications and/or client devices 406 that are connected to a RAN of a radio-based network 103 having an associated core network. As used herein, the term "network slice" refers to particular network traffic that is assigned a priority according to one or more quality-of-service requirements and/or that is provided with a hardware capacity reservation in order to receive, transmit, or manage the network traffic. The network traffic for the network slice may be identified at one or more network layers, such as the application layer (e.g., through deep packet inspection), the session layer, the transport layer, the network layer, or the data link layer. The network slices may be ephemeral, or having a specific duration in terms of time or data quantity, or may exist until released or cancelled. The network slice allocation service 425 may support an application programming interface (API) that may be called by applications on client devices 406, and/or backend services that interact with those applications, in order to request that a network slice be allocated, modified, or released. Although the network slice allocation service 427 allocates network slices on the radio-based network 103, there may be one or more devices coupled to the radio-based network 103 through one or more fixed or wired links, and the network slices determined by the network slice allocation service 427 may be applicable to such devices as well.

To allocate a network slice, the network slice allocation service 425 may dynamically configure one or more network functions in the radio-based network 103 to implement the quality-of-service requirements for the network traffic that meets the network slice definition. It is noted that a network slice may have a greater or lesser priority than normal traffic, which may have a corresponding cost that is higher or lower than a normal usage cost. In some scenarios, the network slice allocation service 425 may increase or decrease allocated computing capacity 421 for network function workloads in order to meet the specified quality-of-service requirement. For example, more allocated computing capacity 421 for network functions implementing the network slice may provide a lower latency. In some embodiments, the network slice allocation service 425 may also rearrange network function workloads at different points in the radio-based network 103 to meet the quality-of-service requirement. Additionally, the network slice allocation service 425 may instantiate a content delivery service 426 in order to provide content 427 at different points in the radio-based network 103 in order to meet a quality-of-service requirement.

In some embodiments, application developers or application owners can specify required network slice configuration in an application template used to deploy a particular application in the cloud provider network 203, such that the application can provide this information to the network slice allocation service 427 when making an API-based request for a network slice. In some embodiments, the network slice allocation service 427 automatically determines one or more optimal network slices for a customer's application or for their overall radio-based network 103. To this end, the network slice allocation service 427 may train one or more machine learning models to recognize network slice configurations in view of conditions for a customer or across multiple customers. The machine learning models then may be used to identify optimal network slices to be allocated for given device types or applications determined to be present in the radio-based network 103. For example, the network slice allocation service 427 may receive detailed network information or automatically probe the radio-based network 103 to understand devices, applications, latencies, usage patterns, and so forth. The network slice allocation service 427 can then provide this information to the machine learning model to automatically determine one or more network slices to optimize latency, bandwidth, reliability, or other metrics. These automatically determined network slices may then be automatically allocated by the network slice allocation service 427.

The content delivery service 426 is executed to serve content 427 from edge locations (such as PoPs and other edge locations 303 described herein, referred to collectively as a content delivery network or CDN) to applications executed in client devices 406 coupled to the radio-based network 103. In some embodiments, the content delivery service 426 predictively caches certain items of content 427 at the edge of the radio-based network 103 or another location in order to meet a quality-of-service requirement for a network slice. The content 427 may be determined prior to any content consumption request by a customer based at least in part on the customer's account, including interests, consumption history, subscription status, browsing history, purchasing history, and/or other information. In some scenarios, the content delivery service 426 may be self-hosted by a customer associated with the radio-based network 103.

The data stored in the data store 415 includes, for example, one or more network plans 439, one or more cellular topologies 442, one or more spectrum assignments 445, device data 448, one or more RBN metrics 451, customer billing data 454, radio unit configuration data 457, antenna configuration data 460, network function configuration data 463, one or more network function workloads 466, one or more customer workloads 469, data regarding one or more network slices 470, and potentially other data.

The network plan 439 is a specification of a radio-based network 103 to be deployed for a customer. For example, a network plan 439 may include premises locations or geographic areas to be covered, a number of cells, device identification information and permissions, a desired maximum network latency, a desired bandwidth or network throughput for one or more classes of devices, one or more quality-of-service parameters for applications or services, and/or other parameters that can be used to create a radio-based network 103. A customer may manually specify one or more of these parameters via a user interface. One or more of the parameters may be prepopulated as default parameters. In some cases, a network plan 439 may be generated for a customer based at least in part on automated site surveys using unmanned aerial vehicles. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc.

The cellular topology 442 includes an arrangement of a plurality of cells for a customer that takes into account reuse of frequency spectrum where possible given the location of the cells. The cellular topology 442 may be automatically generated given a site survey. In some cases, the number of cells in the cellular topology 442 may be automatically determined based on a desired geographic area to be covered, availability of backhaul connectivity at various sites, signal propagation, available frequency spectrum, and/or on other parameters.

The spectrum assignments 445 include frequency spectrum that is available to be allocated for radio-based networks 103 as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing wireless devices 106 (FIG. 1) that are permitted to connect to the radio-based network 103. This device data 448 includes corresponding users, account information, billing information, data plan, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on.

The RBN metrics 451 include various metrics or statistics that indicate the performance or health of the radio-based network 103. Such RBN metrics 451 may include bandwidth metrics, dropped packet metrics, signal strength metrics, latency metrics, and so on. The RBN metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The radio unit configuration data 457 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based network 103. In various embodiments, the network functions may be deployed in VM instances or containers located in computing devices 418 that are at cell sites, at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to perform one or more of the network functions.

The customer workloads 469 correspond to machine images, containers, or functions of the customer that may be executed as VM instances or containers alongside or in place of the network function VM instances or containers. For example, the customer workloads 469 may provide or support a customer application or service.

The network slices 470 correspond to flows of network traffic that have been designated for one or more specific quality-of-service requirements 471. The flows may correspond to flows associated with a specific application executed on a specific client device 406, all network traffic from a specific client device 406, flows to a specific destination from all client devices 406, flows to a specific destination from a specific client device 406, and so forth. In one example, a network slice 470 is identified by a source port, a source network address, a destination port, a destination network address, and/or other information. A network slice 470 may be valid for a specific period of time or for a specific quantity of data, or the network slice 470 may be valid until cancelled or released. In one example, a network slice 470 is allocated on-demand for a specific application executed on a client device 406. In some scenarios, a network slice 470 has specific recurring time periods of validity (e.g., every weeknight from midnight to 5 a.m.), or the quality-of-service requirement 471 for a network slice 470 may change based upon recurring time periods, current cost level, and/or other factors or events.

The quality-of-service requirement 471 may correspond to a minimum or maximum bandwidth, a minimum or maximum latency, a minimum or maximum reliability measure, a minimum or maximum signal strength, and so on. The quality-of-service requirement 471 may be associated with a corresponding level of cost, which may include a fixed component, a usage-based component, and/or a congestion-based component. For example, a quality-of-service requirement 471 may be associated with a recurring monthly fixed cost, a per-session or per-megabyte cost, and/or a dynamic cost based upon congestion at a cell site or a particular network link. In some cases, customers may select a quality-of-service requirement 471 that provides a high level of service. In other cases, however, customers may select a quality-of-service requirement 471 that provides a low level of cost but lowers the quality-of-service during certain times or in certain aspects. For example, a customer may choose a quality-of-service requirement 471 that allows for high throughput overnight and otherwise lower priority throughput in order to send backup data over the network at a low cost.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. In particular, the client application 436 may be configured to request a network slice 470 from the network slice allocation service 425 and to specify one or more quality-of-service requirements 471 for the network slice 470. The client application 436 can then use the network slice 470 to communicate with one or more backend services, such as a content delivery service 426, a video conferencing service, a telephony service, a social network service, a data backup service, and/or other types of backend services and/or destinations. The client device 406 may be configured to execute applications beyond the client application 436 such as, for example, email applications, social networking applications, word processors, spreadsheets, and/or other applications.

Figure 5:
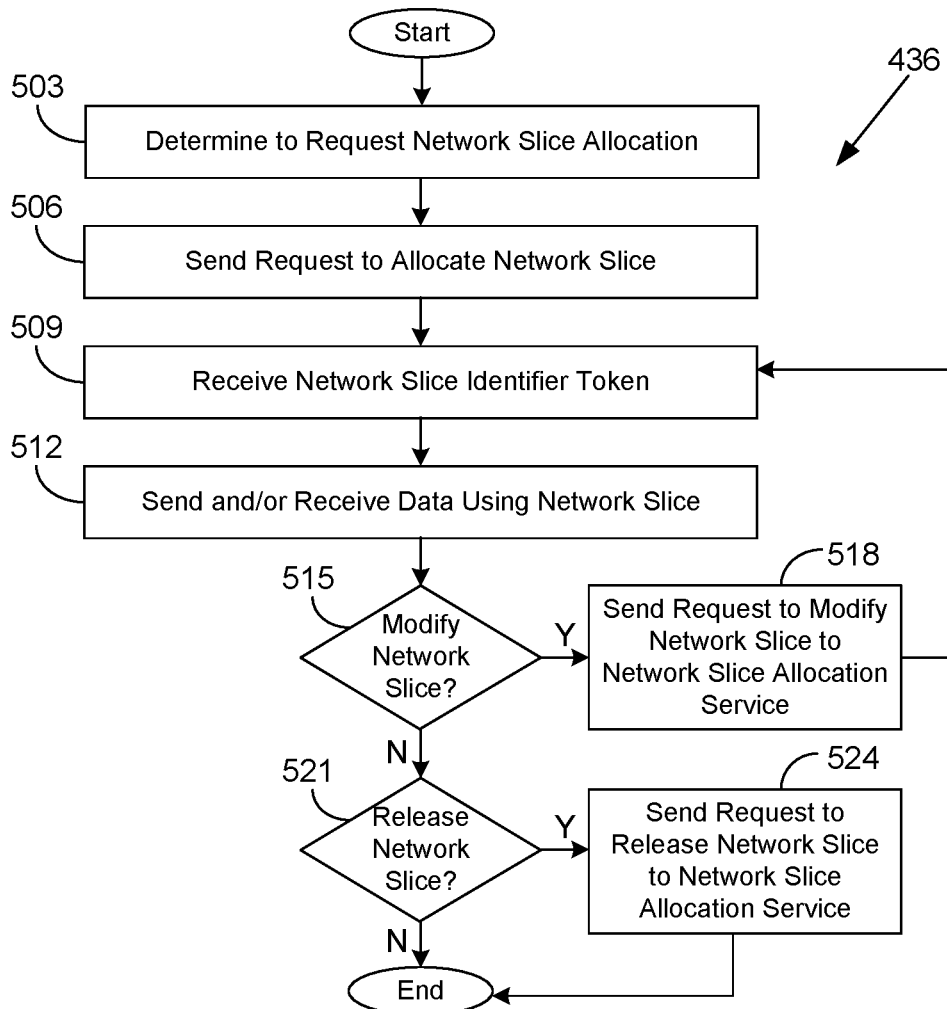
FIG. 5 is a flowchart illustrating one example of functionality implemented as portions of a client application executed in a client device in the networked environment of FIG. 4 according to various embodiments of the present disclosure.

Referring next to FIG. 5, shown is a flowchart that provides one example of the operation of a portion of the client application 436 according to various embodiments. It is understood that the flowchart of FIG. 5 provides merely an example of the many different types of functional arrangements that may be employed to implement the operation of the portion of the client application 436 as described herein. As an alternative, the flowchart of FIG. 5 may be viewed as depicting an example of elements of a method implemented in the client device 406 (FIG. 4) according to one or more embodiments.

Beginning with box 503, the client application 436 determines to request an allocation of a network slice 470 (FIG. 4) on a radio-based network 103 (FIG. 4) for example by calling a network slicing API. In some cases, the client application 436 may render a user interface that enables the user to specifically request an allocation of a network slice 470 and to configure parameters corresponding to the quality-of-service requirements 471 (FIG. 4). For example, the client application 436 may render a user interface that includes a slider that adjusts between low latency paired with high cost and high latency paired with low cost. The user interface may also allow for configuration of settings relating to bandwidth, reliability, number of network hops, and/or other parameters relating to network service quality. In some implementations, the network slice settings can be specified by an application developer or owner and stored as part of an application template that can be used to launch the application within the radio-based network. Network slice settings can include required capacity of the underlying shared hardware resources of the radio-based network 103, as well as settings such as rate limits and network topology. The service can determine how to orchestrate and deploy only the network functions necessary to support a particular network slice. Network slice settings can also include parameters relating to scaling of the network slice, so that the quantity of reserved resources can be dynamically adjusted based on demand for that particular application. In this manner, each application can receive a unique set of resources and network topology that suit connectivity, speed, latency, and capacity needs of that application.

In other scenarios, the client application 436 may determine to request the network slice 470 automatically. For example, network congestion may be causing impaired performance relative to an internal quality-of-service measure or requirement, and the client application 436 may be configured to request a network slice 470 to mitigate the performance impairment. A user may also specify through a user interface a metric that indirectly causes the client application 436 to automatically request a network slice 470. For example, in a video conferencing application, a user may check a box that enables requesting network slices 470 to maintain video conference quality.

In box 506, the client application 436 sends a request to allocate a network slice 470 that causes the network slice allocation service 425 (FIG. 4) to allocate the network slice 470. The request may be sent directly to the network slice allocation service 425 or to an intermediate entity. The request may specify one or more quality-of-service requirements 471, such as latency, bandwidth, reliability, jitter, or other requirements. The requirements may be expressed as a maximum, minimum, median, average, or other threshold measure. Insofar as a quality-of-service requirement 471 may be associated with a corresponding cost, the request may instead specify target costs such as maximum costs, minimum costs, or ranges that the customer is willing to spend on a quality-of-service dimension, such as bandwidth, latency, etc., and the network will assign a corresponding service level based upon the price the customer is willing to bear. In some cases, allocating a network slice may involve adding or reserving additional frequency spectrum, which may have an associated cost. In such cases, the customer may place bids for the additional frequency spectrum in, for example, a spot market for spectrum allocations.

Also, the client application 436 may specify a duration for the network slice 470, which may correspond to a length of time, a data quantity, or another measure, after which another network slice 470 or default network slice 470 may take effect. For example, the duration may correspond to a session of the application. Where no duration is specified, the network slice 470 may be valid until released or cancelled. The request may be sent to the network slice allocation service 425 by way of an application programming interface (API), and the customer and/or client application 436 may be required to provide one or more security credentials for authentication purposes. In some embodiments, the request may be sent to the network slice allocation service 425 by a backend service that interacts with the client application 436 rather than from the client application 436 directly. For example, the request may be sent from a video conferencing service provider rather than from a video conferencing client application 436 executed in the client device 406.

In box 509, the client application 436 receives a network slice identifier token from the network slice allocation service 425 in order to identify the network traffic subject to the network slice 470 in the radio-based network 103. For example, the client application 436 may insert the token in a packet or segment of data to be subject to the network slice 470. In this way, the client application 436 can designate which network traffic should be routed through the network slice 470 instead of a default routing or another allocated network slice 470. In one embodiment, the network slice identifier token is an OAuth token. Alternatively, flow identification information (e.g., source port, source network address, designation port, destination address) may be provided to the network slice allocation service 425 in order to identify the network traffic to be routed in the network slice 470. In another example, all traffic from the client application 436, as determined by deep packet inspection, may be routed via the network slice 470. In still another example, network traffic from multiple client applications 436 or all client applications 436 on a client device 406 may be routed through the same network slice 470.

In box 512, the client application 436 sends and/or receives data using the allocated network slice 470. In some scenarios, other client applications 436 on the same client device 406 continue sending or receiving data without using the allocated network slice 470. For example, an email application may continue using a default network connection rather than a network slice 470 that has been allocated for a media player application. Also, the client application 436 may use a different network slice 470 or a default network connection for sending and/or receiving other types of network traffic.

In box 515, the client application 436 determines whether to modify the network slice 470. For example, the customer may request a different quality-of-service requirement 471 or the current quality-of-service requirement 471 may not be sufficient for a current usage of the client application 436. The difference may be an increased quality-of-service requirement 471 or a decreased quality-of-service requirement 471. In some cases, the network slice 470 may be scaled automatically based upon observed network traffic in the network slice, or demand, in order to maintain a QoS requirement. If the client application 436 determines to modify the network slice 470, the client application 436 moves from box 515 to box 518 and sends a request to modify the network slice 470 to the network slice allocation service 425. For example, the request to modify may be sent automatically by the client application 436 via an API. The client application 436 then returns to box 509 and may receive an updated token.

If the client application 436 determines not to modify the network slice 470, the client application 436 moves from box 515 to box 521 and determines whether to release or cancel the current network slice 470. For example, an application session may have ended, and the network slice 470 may not be necessary. If the client application 436 determines to release the network slice 470, the client application 436 moves from box 521 to box 524 and sends a request to release the network slice 470 to the network slice allocation service 425. For example, the request to release may be sent by way of an API. Thereafter, the operation of the client application 436 ends.

Figure 6:
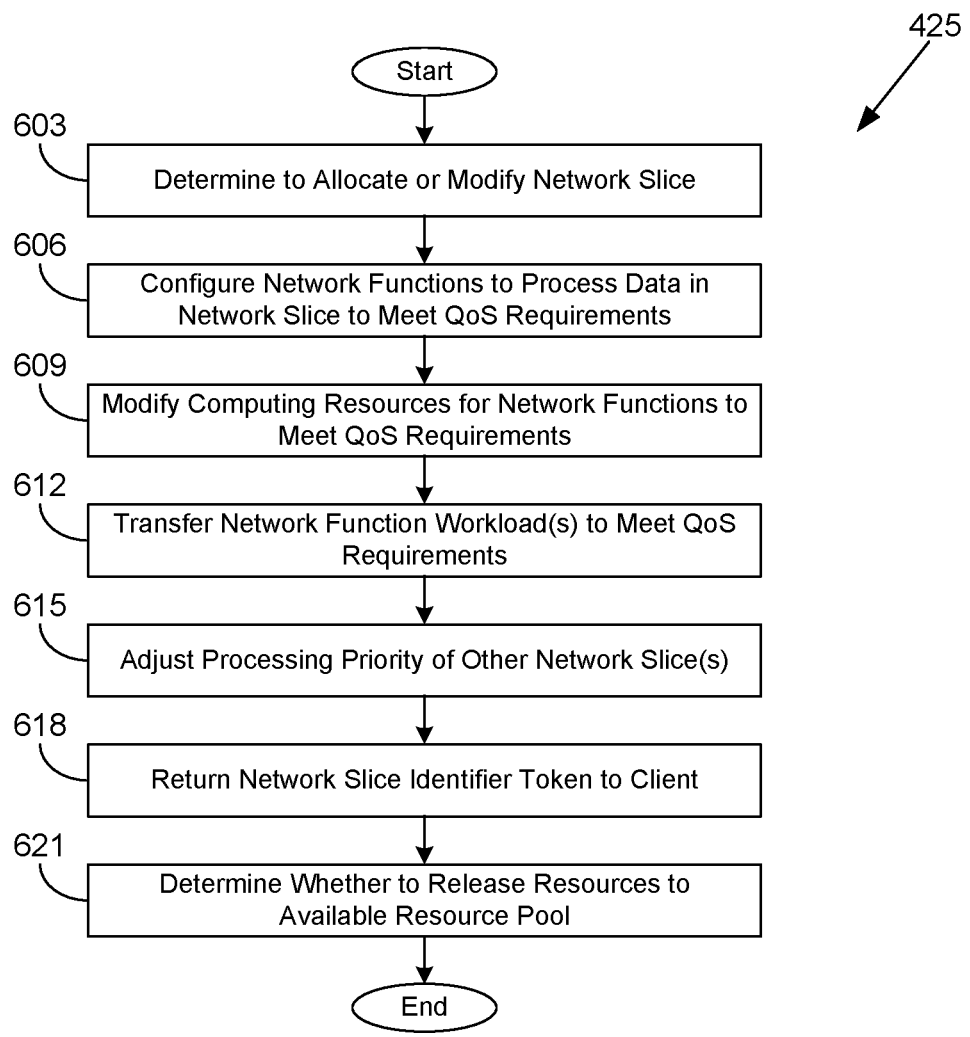
FIGS. 6 and 7 are flowcharts illustrating examples of functionality implemented as portions of a network slice allocation service executed in a computing environment in the networked environment of FIG. 4 according to various embodiments of the present disclosure.

Moving on to FIG. 6, shown is a flowchart that provides one example of the operation of a portion of the network slice allocation service 425 according to various embodiments. It is understood that the flowchart of FIG. 6 provides merely an example of the many different types of functional arrangements that may be employed to implement the operation of the portion of the network slice allocation service 425 as described herein. As an alternative, the flowchart of FIG. 6 may be viewed as depicting an example of elements of a method implemented in the computing environment 403 (FIG. 4) according to one or more embodiments.

Beginning with box 603, the network slice allocation service 425 determines to allocate a network slice 470 (FIG. 4) or to modify an existing network slice 470 on a radio-based network 103 (FIG. 4). The network slice allocation service 425 may manage network slices for a plurality of different radio-based networks 103 of a plurality of customers. In one example, the network slice allocation service 425 receives an API-based request to allocate or modify a network slice 470 for a client application 436 (FIG. 4) or for a client device 406 (FIG. 4). As described herein, the client application 426 may be a software application that communicates with other applications and/or end user devices over the radio-based network 103. The request may be received from the client application 436 directly or from a backend service or other host in communication with the client application 436. The request may include a security credential or other identifier to authenticate a customer associated with the client application 436. The request specifies one or more quality-of-service requirements 471 (FIG. 4) for the network slice 470 and potentially costs that the customer is willing to pay to meet those requirements. In one example, the network slice 470 is associated with a lesser quality-of-service requirement 471 than a default connection via the radio-based network 103. In another example, the network slice 470 is associated with a higher quality-of-service requirement 471 than a default connection via the radio-based network 103. The request may specify a duration in terms of a time period, a data quantity, or based on operations of the application, and the network function(s) may be reconfigured to release the network slice 470 when the duration is met.

In other examples, the network slice allocation service 425 automatically determines to allocate or modify a network slice 470 based at least in part on a machine learning model and observing a configuration or conditions on the radio-based network 103. In some cases, the network slice allocation service 425 may determine to preconfigure one or more network slices 470 for a new radio-based network 103 that is to be deployed based upon a previous network of the customer or expected usage parameters.

In box 606, the network slice allocation service 425 configures or reconfigures one or more network functions in the radio-based network 103 to process the data of the network slice 470 in order to meet quality-of-service requirements 471. For example, the network slice allocation service 425 may configure the network functions to process the data with a higher priority or a lower priority to result in a lower or higher latency measure or other measures. In another example, the network slice allocation service 425 may configure the network functions to prioritize data from the application up to a specified maximum bandwidth or up to a specified minimum latency. In one example, a client application 436 that is a gaming application may have a requirement of very low latency. The network slice allocation service 425 may also make reservations in underlying network hardware to reserve capacity for the network slice 270. In some cases, the network slice allocation service 425 may allocate network capacity to a network slice 270 in an oversubscribed manner, such that the allocated network capacity for a plurality of network slices 270 may exceed the actual network hardware capacity. This may be done in response to determining a forecasted ability of the network capacity to meet the QoS requirements 471 of the network slices 270. Such a forecast may be generated based at least in part on past network traffic volumes, data indicating predicted future volumes, and so on.

It is noted that network slices 470 may be configured either for portions of the radio-based network 103 or the entire radio-based network 103. For example, if a given device is to be given a very low latency quality-of-service requirement, and it is known that the device is at a fixed location in one cell 109 (FIG. 1), the network functions associated with that cell 109 may be configured to implement the network slice 470 and not the network functions associated with other cells 109. In other words, a network slice 470 may be enabled or disabled on a per-cell basis or based on another type of network subdivision (e.g., in one region 306 (FIG. 3) but not another region 306).

In box 609, the network slice allocation service 425 may increase or decrease computing resources in the allocated computing capacity 421 (FIG. 4) for the network functions in order to meet the quality-of-service requirements 471 for the network slice 470. For example, the network slice allocation service 425 may launch additional machine instances or containers to perform the network functions for the network slice 470 to reduce latency, increase reliability, etc. The allocated computing capacity 421 for network functions may be scaled up, left unmodified, or scaled down in other examples. For instance, if a network slice 470 is configured with a higher latency value, the allocated computing capacity 421 for network functions may be overprovisioned and capable of being reduced without sacrificing the newly created quality-of-service requirement 471. On the flip side, the network slice allocation service 425 may determine to terminate existing machine instances or containers if the capacity is not necessary for the modified network slice 470.

In box 612, the network slice allocation service 425 may transfer network function workloads 466 (FIG. 4) to allocated computing capacity 421 on different computing devices 418 (FIG. 4) in order to meet the quality-of-service requirements 471. For example, the network slice allocation service 425 may move the network function workloads 466 to edge locations, such as cell sites or customer aggregation sites, to improve latency or other quality-of-service measures. The cell sites may be identified as a cell site currently in use by the client device 406 or one or more cell sites predicted to be in use by the client device 406.

Transferring the network function workloads 466 may involve relocating customer workloads 469 (FIG. 4) of the requesting customer or other customers away from the computing device 418, or possibly reducing the allocated computing capacity 421 on the computing device 418 to make room for the network function(s). In some cases, network function workloads 466 may be transferred to the associated core network and away from the edge locations. In box 615, the network slice allocation service 425 adjusts a processing priority of the other network slices 470 that have a lower or higher quality-of-service requirement 471 in order to make room for and to meet the quality-of-service requirement 471 for the newly allocated network slice 470. Alternatively, the quality-of-service requirements 471 for other existing network slices 470 may be decreased or increased.

In box 618, the network slice allocation service 425 may return a network slice identifier token to the customer via the API. The token may be used by the client device 406 and/or the client application 436 in order to designate network traffic for the network slice 470. In box 621, the network slice allocation service 425 determines whether to release resources to an available resource pool. For example, if resources allocated to the network slice 470 are scaled down, those resources may be made available for allocation to other network slices 470 or generally for operation of the network. Thereafter, the operation of the portion of the network slice allocation service 425 ends.

Figure 7:
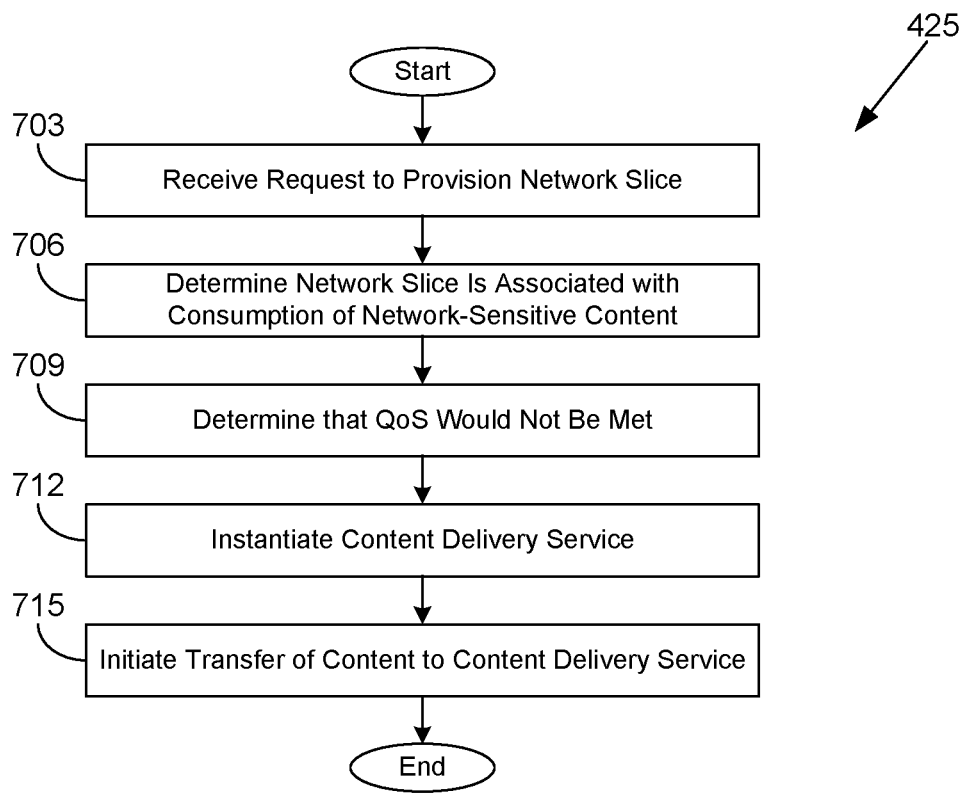

Continuing to FIG. 7, shown is a flowchart that provides one example of the operation of another portion of the network slice allocation service 425 according to various embodiments. It is understood that the flowchart of FIG. 7 provides merely an example of the many different types of functional arrangements that may be employed to implement the operation of the portion of the network slice allocation service 425 as described herein. As an alternative, the flowchart of FIG. 7 may be viewed as depicting an example of elements of a method implemented in the computing environment 403 (FIG. 4) according to one or more embodiments.

Beginning with box 703, the network slice allocation service 425 receives a request to allocate a network slice 470 (FIG. 4) for a client application 436 (FIG. 4) or for a client device 406 (FIG. 4). The request may be received from the client application 436 directly or from a backend service or other host in communication with the client application 436. The request may include a security credential or other identifier to authenticate a customer associated with the client application 436. The request specifies one or more quality-of-service requirements 471 (FIG. 4) for the network slice 470. In one example, the network slice 470 is associated with a lesser quality-of-service requirement 471 than a default connection via the radio-based network 103 (FIG. 4). In another example, the network slice 470 is associated with a higher quality-of-service requirement 471 than a default connection via the radio-based network 103. The request may specify a duration in terms of a time period, application lifecycle, or data quantity, and the network function(s) may be reconfigured to release the network slice 470 when the duration is met.

In box 706, the network slice allocation service 425 determines that the network slice 470 is associated with the consumption of network-sensitive content 427 (FIG. 4). For example, the client application 436 requesting the network slice 470 may be a video player application executed on a smart television or television companion device. The content may be network-sensitive in that it may be sensitive to latency or dropped packets, and it may require a relatively large quantity of data to be sent. Network problems may present in a diminished user experience in consuming the content, such as with audio or video artifacts or pauses. Other examples of content include streaming of video to other devices, or for games or AR/VR applications. In box 709, the network slice allocation service 425 determines that the quality-of-service requirement 471 would not be met based upon a current location of the content delivery service 426 (FIG. 4) in the network. For example, the content 427 may have to traverse a congested backbone communications link.

In box 712, the network slice allocation service 425 causes the content delivery service 426 to be instantiated on the radio-based network 103. In one example, the content delivery service 426 is instantiated at an edge location such as a cell site or a customer site. Also, the network may be otherwise prepared for the network slice 470 as described in boxes 606-618 in the flowchart of FIG. 6. In some cases, computing capacity allocated for network functions may be released and reallocated in favor of the content delivery service 426 if optimal to meet the quality-of-service requirement 471.

In box 715, the network slice allocation service 425 initiates a transfer of content 427 to the content delivery service 426. For example, the content delivery service 426 may be configured to predictively cache content from a primary content delivery service 426 for the customer associated with the network slice 470. Such predictive caching may be based upon a prediction using information associated with the customer's account, including content consumption history, purchase history, interests, favorite genres, watch lists, etc. The content 427 may be predictively cached during off-hours when a backbone communications link is less congested. In one scenario, the transfer of the content 427 is initiated in response to determining that consumption of the content 427 is not meeting the quality-of-service requirement 471. Alternatively, the content 427 is transferred before a client device 406 for which the network slice 470 is provisioned requests the content 427. Thereafter, the operation of the portion of the network slice allocation service 425 ends.

Although the example of FIG. 7 refers to a content delivery service 426, the network slice allocation service 425 may instantiate other types of endpoint services that support network communication with client devices 406. If the network slice 470 is no longer needed, the instantiated service such as the content delivery service 426 may be terminated, and/or the content 427 may be discarded from the content delivery service 426.

Figure 8:
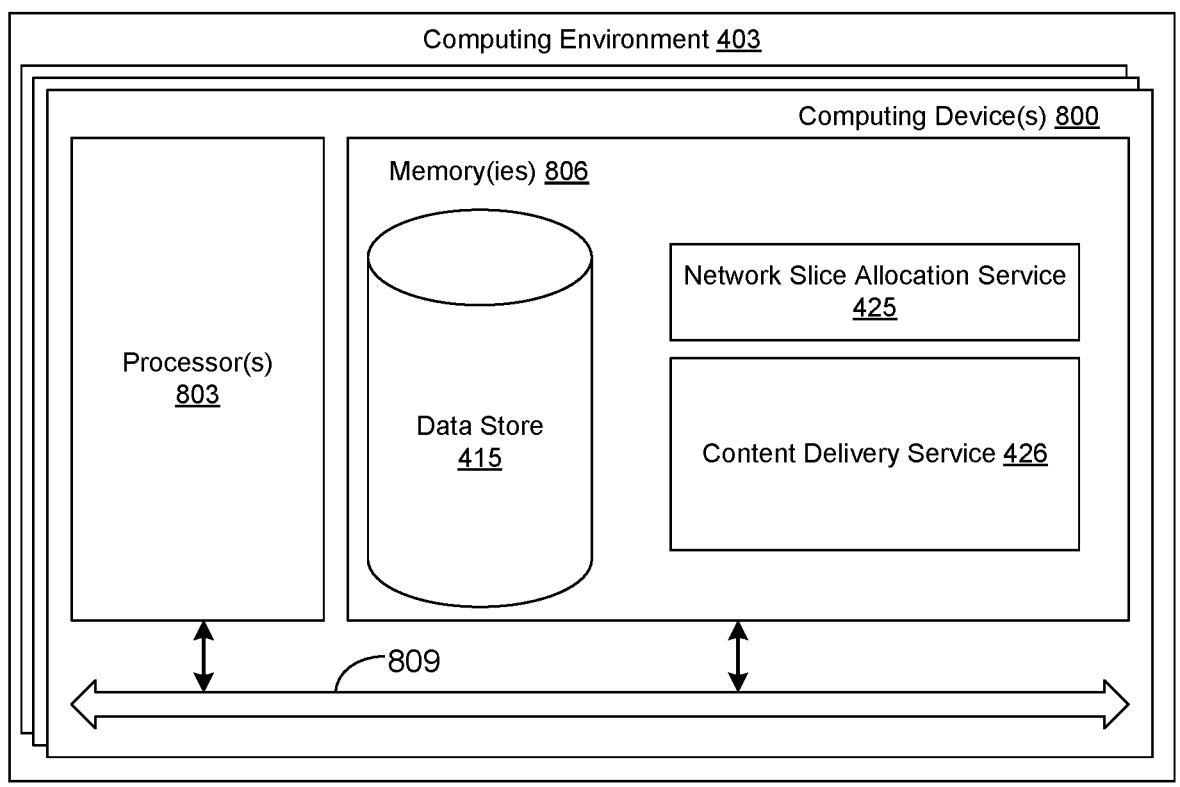
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the network slice allocation service 425, the content delivery service 426, and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the network slice allocation service 425, the content delivery service 426, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-7 show the functionality and operation of an implementation of portions of the network slice allocation service 425 and the client application 436 (FIG. 4). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network slice allocation service 425 and the content delivery service 426, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network slice allocation service 425 and the content delivery service 426, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be described by one or more of the following clauses:

Clause 1. A system, comprising: a radio-based network including a radio access network and associated core network, wherein an application utilizes a network slice of the radio-based network to send and/or receive network traffic; a network slice allocation service configured to dynamically modify the network slice in response to application programming interface (API) requests from the application; and at least one computing device implementing the application, wherein the application is configured to at least: determine that the network slice does not meet a quality-of-service requirement including at least one of: a minimum bandwidth requirement or a minimum latency requirement; send a first API request that causes the network slice allocation service to reserve additional capacity for the network slice for the application in the radio-based network, the network slice providing the quality-of-service requirement; use the network slice to send and/or receive the network traffic; determine that the network slice exceeds the quality-of-service requirement; and send a second API request to the network slice allocation service to release at least a portion of capacity reserved for the network slice.

Clause 2. The system of clause 1, wherein the application is further configured to at least: obtain a token identifying the network slice from the network slice allocation service; and wherein one or more data packets sent using the network slice identify the network slice with the token.

Clause 3. The system of clauses 1 to 2, wherein the application is further configured to send or receive subsequent data using a default network connection instead of the network slice after sending the second API request.

Clause 4. A method, comprising: determining, via at least one computing device, that an application executed in a particular computing device has a quality-of-service requirement, the particular computing device being connected to a communications network; sending, via the at least one computing device, a request that causes a network slice allocation service to reserve a network slice having the quality-of-service requirement in the communications network; and transmitting, via the at least one computing device, data to or from the application using the network slice.

Clause 5. The method of clause 4, further comprising transmitting, via the at least one computing device, other data to or from another application executed in the particular computing device without using the network slice.

Clause 6. The method of clauses 4 to 5, further comprising: determining, via the at least one computing device, a duration for the network slice based at least in part on a length of time that the application has the quality-of-service requirement; and wherein the request specifies the duration.

Clause 7. The method of clause 6, wherein the duration corresponds to a session of the application.

Clause 8. The method of clauses 4 to 7, further comprising: determining, via the at least one computing device, that the application no longer has the quality-of-service requirement; and sending, via the at least one computing device, a subsequent request to the network slice allocation service to release the network slice.

Clause 9. The method of clauses 4 to 8, further comprising: determining, via the at least one computing device, that the application has an increased quality-of-service requirement; and sending, via the at least one computing device, a subsequent request that causes the network slice allocation service to modify the network slice to have the increased quality-of-service requirement.

Clause 10. The method of clauses 4 to 9, further comprising: determining, via the at least one computing device, that the application has a decreased quality-of-service requirement; and sending, via the at least one computing device, a subsequent request that causes the network slice allocation service to modify the network slice to have the decreased quality-of-service requirement.

Clause 11. The method of clauses 4 to 10, further comprising: determining, via the at least one computing device, that another application executed in the particular computing device has another quality-of-service requirement; and sending, via the at least one computing device, a subsequent request that causes the network slice allocation service to reserve a different network slice for the application, the different network slice being associated with a lesser quality-of-service requirement than a default network slice for the particular computing device.

Clause 12. The method of clauses 4 to 11, wherein the network slice is associated with a lesser latency than a default network slice.

Clause 13. The method of clauses 4 to 12, wherein the quality-of-service requirement includes a minimum latency requirement for the application.

Clause 14. The method of clauses 4 to 13, wherein the quality-of-service requirement includes a minimum bandwidth requirement for the application.

Clause 15. The method of clauses 4 to 14, wherein sending the request that causes the network slice allocation service to reserve the network slice further comprises sending the request from the application executed on the particular computing device to the network slice allocation service via an application programming interface.

Clause 16. The method of clauses 4 to 15, wherein sending the request that causes the network slice allocation service to reserve the network slice further comprises sending the request from a backend service of the application executed in one or more servers to the network slice allocation service via an application programming interface.

Clause 17. A non-transitory computer-readable medium embodying an application executable in a computing device, wherein when executed the application causes the computing device to at least: determine that a network slice in a radio-based network does not meet a quality-of-service requirement for an application; send a request that causes a network slice allocation service to reserve the network slice for the application in the radio-based network, the network slice providing the quality-of-service requirement; and send or receive data using the network slice. Clause 18. The non-transitory computer-readable medium of clause 17, wherein when executed the application further causes the computing device to at least: send a subsequent request to the network slice allocation service to release the network slice.

Clause 19. The non-transitory computer-readable medium of clauses 17 to 18, wherein when executed the application further causes the computing device to at least determine a duration for the network slice, the duration being a time duration or a data quantity, and the request specifies the duration.

Clause 20. The non-transitory computer-readable medium of clauses 17 to 19, wherein when executed the application further causes the computing device to determine a maximum latency for the network slice, and the request specifies the maximum latency.

Clause 21. A system, comprising: a radio-based network including a radio access network and associated core network, wherein applications utilize respective network slices of the radio-based network to send and/or receive network traffic; and a network slice allocation service configured to at least: receive an application programming interface (API) request from an application to allocate a network slice of the radio-based network, wherein the request from the application specifies quality-of-service requirements for the network slice; responsive to the API request, identify a set of network functions from among a plurality of available network functions to process data sent via the network slice so as to meet the quality-of-service requirements for the network slice; and enable the application to use the network slice.

Clause 22. The system of clause 21, wherein the network slice allocation service is further configured to at least increase a quantity of computing resources implementing the set of network functions so as to meet the quality-of-service requirements for the network slice.

Clause 23. The system of clauses 21 to 22, wherein the network slice allocation service is further configured to at least transfer a workload for the set of network functions from a first computing device at an edge location of a cloud provider network that is collocated with at least a portion of the radio-based network to a second computing device at another edge location of the cloud provider network.

Clause 24. The system of clauses 21 to 23, wherein the network slice allocation service is further configured to at least manage a plurality of network slices associated with a plurality of different radio-based networks of a plurality of customers.

Clause 25. The system of clauses 21 to 24, wherein the network slice allocation service is further configured to at least allocate network capacity to a plurality of network slices through oversubscription beyond hardware capacity based at least in part on a forecasted ability to meet the quality-of-service requirements for the plurality of network slices.

Clause 26. The system of clauses 21 to 25, wherein the network slice allocation service enables the application to use the network slice by generating an access token and returning the access token to the application, wherein the application uses the network slice by presenting the access token.

Clause 27. A method, comprising: receiving, via at least one computing device, a request to allocate a network slice in a radio-based network having a radio access network and an associated core network to an application connected to the radio-based network, the request specifying a set of quality-of-service constraints required for the network slice; and configuring, via the at least one computing device, a set of network functions in the radio-based network to implement the network slice.

Clause 28. The method of clause 27, wherein the network slice is associated with a lesser quality-of-service requirement than a default connection via the radio-based network.

Clause 29. The method of clauses 27 to 28, wherein the network slice is associated with a higher quality-of-service requirement than a default connection via the radio-based network.

Clause 30. The method of clauses 27 to 29, wherein configuring the set of network functions further comprises moving via the at least one computing device, at least one network function workload from a first computing device to a second computing device in order to implement the network slice, wherein one of the first computing device and the second computing device is located in a data center, and another one of the first computing device and the second computing device is located at a cell site.

Clause 31. The method of clauses 27 to 30, wherein configuring the set of network functions further comprises scaling, via the at least one computing device, a quantity of computing resources allocated to at least one network function workload in order to implement the network slice.

Clause 32. The method of clause 31, wherein scaling the quantity of computing resources allocated to the at least one network function workload further comprises increasing, via the at least one computing device, a number of virtual machine instances or containers that execute the at least one network function workload.

Clause 33. The method of clauses 27 to 32, wherein configuring the set of network functions further comprises configuring, via the at least one computing device, at least one corresponding network function to prioritize data from the application up to a specified maximum bandwidth or a specified minimum latency.

Clause 34. The method of clauses 27 to 33, wherein the request specifies a duration in a time period or a data quantity, and the method further comprises reconfiguring, via the at least one computing device, at least one network function workload in the radio-based network when the duration is met to release the network slice.

Clause 35. The method of clauses 27 to 34, wherein the request is received from a backend service associated with the application via an application programming interface (API) call made by the backend service.

Clause 36. A non-transitory computer-readable medium embodying a network slice allocation service executable in at least one computing device, wherein when executed the network slice allocation service causes the at least one computing device to at least: determine to allocate a network slice to an application communicating via a radio-based network, the network slice having a specified quality-of-service requirement; configure at least one network function in the radio-based network to process data sent via the network slice so as to meet the specified quality-of-service requirement for the network slice; and scale a quantity of computing resources implementing the at least one network function so as to meet the specified quality-of-service requirement for the network slice.

Clause 37. The system of clause 36, wherein the network slice corresponds to all data sent from a client device on the radio-based network to a destination.

Clause 38. The system of clauses 36 to 37, wherein the network slice corresponds to all data sent from a particular application executed in a client device on the radio-based network.

Clause 39. The system of clauses 36 to 38, wherein when executed the network slice allocation service causes the at least one computing device to at least configure the at least one network function in the radio-based network to deprioritize other data sent via another network slice so as to meet the specified quality-of-service requirement for the network slice, the other network slice having a lesser quality-of-service requirement than the specified quality-of-service requirement.

Clause 40. The system of clauses 36 to 39, wherein when executed the network slice allocation service causes the at least one computing device to at least transfer at least one workload for the at least one network function from a first computing device in a data center to a second computing device at a cell site in order to meet the specified quality-of-service requirement for the network slice.

Clause 41. A system, comprising: a radio-based network including a radio access network and associated core network, wherein applications utilize respective network slices of the radio-based network to send and/or receive network traffic; and a program configured to at least: receive a request from an application executed in a client device to provision a network slice on the radio-based network, the network slice having a quality-of-service requirement for a session of the application; determine that operation of the application requires transfer of network-sensitive content via the network slice; determine that the network slice would not meet the quality-of-service requirement without providing the network-sensitive content at an edge location in the radio-based network; and initiate a transfer of the network-sensitive content to a content delivery service at the edge location in the radio-based network in order to meet the quality-of-service requirement for the network slice.

Clause 42. The system of clause 41, wherein the edge location is an edge location of a cloud provider network collocated with equipment of the radio access network.

Clause 43. The system of clauses 41 to 42, wherein when executed the program further causes the at least one computing device to at least increase a quantity of computing resources in the radio-based network that performs at least one network function for the network slice.

Clause 44. The system of clauses 41 to 43, wherein when executed the program further causes the at least one computing device to at least discard the network-sensitive content from the content delivery service at the edge location upon determining that the network slice has been released.

Clause 45. A method, comprising: provisioning, via at least one computing device in response to an application programming interface (API) request, that a network slice with a quality-of-service requirement in a radio-based network having a radio access network and an associated core network; and initiating, via the at least one computing device in response to the API request, a transfer of content to a content delivery service at an edge location in the radio-based network in order to meet the quality-of-service requirement for the network slice.

Clause 46. The method of clause 45, further comprising provisioning, via the at least one computing device, the network slice for a session of an application executed on a device connected to the radio-based network.

Clause 47. The method of clauses 45 to 46, further comprising: determining, via the at least one computing device, that a network connection from an endpoint of the network slice to a primary content delivery service does not meet the quality-of-service requirement; and launching, via the at least one computing device, the content delivery service.

Clause 48. The method of clauses 45 to 47, further comprising: determining, via the at least one computing device, that consumption of the content via the network slice does not meet the quality-of-service requirement; and wherein the transfer of the content is initiated further in response to determining that the consumption of the content does not meet the quality-of-service requirement.

Clause 49. The method of clauses 45 to 48, further comprising reallocating, via the at least one computing device, computing capacity at the edge location from at least one network function of the radio-based network to the content delivery service.

Clause 50. The method of clause 49, wherein reallocating the computing capacity at the edge location further comprises: terminating, via the at least one computing device, a first machine instance configured to perform the at least one network function on a computing device at the edge location; and launching, via the at least one computing device, a second machine instance configured to host the content delivery service on the computing device at the edge location.

Clause 51. The method of clauses 45 to 50, further comprising configuring, via the at least one computing device, an application to use the network slice in order to obtain the content via the radio-based network.

Clause 52. The method of clauses 45 to 51, further comprising transferring, via the at least one computing device, the content from the edge location to a client device that connects via the radio-based network.

Clause 53. The method of clauses 45 to 52, further comprising identifying, via the at least one computing device, the content based at least in part on a prediction that the content will be consumed, the prediction corresponding to an account associated with the network slice.

Clause 54. A non-transitory computer-readable medium embodying a network slice allocation service executable in the at least one computing device, wherein when executed the network slice allocation service causes the at least one computing device to at least: receive a request to create a network slice with a quality-of-service requirement for an application executed in a client device in a radio-based network having a radio access network and an associated core network; determine a service with which the application will communicate using the network slice; and provision computing resources for the service in the radio-based network in order to meet the quality-of-service requirement.

Clause 55. The non-transitory computer-readable medium of clause 54, wherein when executed the network slice allocation service further causes the at least one computing device to at least determine that the network slice would not meet the quality-of-service requirement without provisioning the computing resources.

Clause 56. The non-transitory computer-readable medium of clauses 54 to 55, wherein provisioning the computing resources comprises launching a machine instance for the service.

Clause 57. The non-transitory computer-readable medium of clauses 54 to 56, wherein the computing resources are provisioned for a duration of the network slice and are released upon a termination of the network slice.

Clause 58. The non-transitory computer-readable medium of clauses 54 to 57, wherein at least a portion of the computing resources are provisioned at a cell site through which the client device is connected to the radio-based network.

Clause 59. The non-transitory computer-readable medium of clauses 54 to 58, wherein at least a portion of the computing resources are provisioned at one or more cell sites through which the client device is predicted to become connected to the radio-based network.

Clause 60. The non-transitory computer-readable medium of clause 54 to 59, wherein the service corresponds to a content delivery service that provides content to the application, and provisioning the computing resources further comprises caching at least a portion of the content.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
a radio-based network including a radio access network and an associated core network; and
at least one computing device implementing an application, wherein the application is configured to at least:
determine that the application has an increased quality-of-service requirement in order to send or receive data via the radio-based network, the increased quality-of-service requirement being greater than an existing quality-of-service provided to the application by the radio-based network;
send a request that causes capacity in a network slice of the radio-based network to be allocated for the application, the network slice having the increased quality-of-service requirement; and
send or receive the data using the network slice.

2. The system of claim 1, wherein the application is further configured to at least receive a user selection of an option corresponding to the increased quality-of-service requirement.

3. The system of claim 1, wherein the request is sent by the application via a service application programming interface (API) of the radio-based network.

4. The system of claim 1, further comprising a service in the radio-based network configured to at least create the network slice in the radio-based network in response to the request.

5. The system of claim 1, further comprising a service in the radio-based network configured to at least reserve capacity for the network slice in the radio-based network in response to the request.

6. A computer-implemented method, comprising:
determining that an application implemented in a particular computing device has an increased quality-of-service requirement in order to send or receive data via a communications network, the increased quality-of-service requirement being greater than an existing quality-of-service provided to the application by the communications network;
sending, by the application, a request that causes capacity in a network slice having the increased quality-of-service requirement in the communications network to be allocated for the application; and
transmitting the data to or from the application using the network slice.

7. The computer-implemented method of claim 6, further comprising dynamically modifying a quality-of-service requirement of the network slice in order to meet a performance requirement of the application.

8. The computer-implemented method of claim 6, wherein determining that the application implemented in the particular computing device has the increased quality-of-service requirement further comprises determining that a user of the application has selected an option corresponding to the increased quality-of-service requirement.

9. The computer-implemented method of claim 6, wherein the data comprises video data, and determining that the application implemented in the particular computing device has the increased quality-of-service requirement further comprises determining that a user of the application has selected an option corresponding to a high-priority video stream having the increased quality-of-service requirement.

10. The computer-implemented method of claim 6, wherein the application sends the request via a service application programming interface (API).

11. The computer-implemented method of claim 6, further comprising creating, via a service in the communications network, the network slice in the communications network in response to the request.

12. The computer-implemented method of claim 6, further comprising dynamically adjusting, via a service in the communications network, a quantity of reserved resources for the network slice in the communications network based at least in part on a demand for the application.

13. The computer-implemented method of claim 6, further comprising reserving, via a service in the communications network, the capacity for the network slice in the communications network in response to the request.

14. The computer-implemented method of claim 13, wherein reserving the capacity for the network slice in the communications network further comprises reserving additional frequency spectrum for a radio access network to accommodate the network slice.

15. A computer-implemented method, comprising:
  determining that an application implemented in a particular computing device has a quality-of-service requirement in order to send or receive data via a communications network;
  sending, by the application, a request that causes a network slice in the communications network to be dynamically modified to have the quality-of-service requirement; and
  transmitting the data to or from the application using the network slice.

16. The computer-implemented method of claim 15, wherein the data is video data, and the quality-of-service requirement ensures that the video data is uninterrupted on the communications network.

17. The computer-implemented method of claim 15, further comprising dynamically adjusting, via a service in the communications network, computing capacity allocated for one or more network functions associated with the network slice in the communications network based at least in part on a demand for the application and the quality-of service requirement.

18. The computer-implemented method of claim 15, further comprising determining whether to deploy one or more network functions for the network slice at a customer site or at a data center situated remotely from the customer site.

19. The computer-implemented method of claim 15, further comprising at least one of:
  reserving additional frequency spectrum for a radio access network to accommodate the network slice; or
  reserving hardware in the communications network to accommodate the network slice.

20. The computer-implemented method of claim 15, wherein the application sends the request via a service application programming interface (API) of the communications network.

* * * * *